(12) United States Patent
Jayaraj et al.

(10) Patent No.: US 12,164,520 B2
(45) Date of Patent: Dec. 10, 2024

(54) RULE-BASED QUERY CONTROL

(71) Applicant: Oracle International Corporation, Redwood Shores, CA (US)

(72) Inventors: Ragupathy Jayaraj, Bangalore (IN); Vamshidhar Reddy Pasham, Hyderabad (IN); Girish Kumar Balachandran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/163,107

(22) Filed: Feb. 1, 2023

(65) Prior Publication Data

US 2024/0256547 A1 Aug. 1, 2024

(51) Int. Cl.
*G06F 16/00* (2019.01)
*G06F 16/2455* (2019.01)
*G06F 21/62* (2013.01)

(52) U.S. Cl.
CPC ...... *G06F 16/2455* (2019.01); *G06F 21/6227* (2013.01)

(58) Field of Classification Search
CPC .. G06F 16/90332; G06F 40/237; G06F 40/30; G06F 16/9038; G06F 40/295; G06F 16/243; G06F 16/24522; G06F 16/248; G06F 16/3322; G06F 16/3344; G06F 16/335; G06F 16/951; G06F 16/9538; G06F 16/1734; G06F 16/2455; G06F 16/24578; G06F 16/283; G06F 16/285; G06F 16/3331; G06F 16/3338; G06F 16/334; G06F 16/38; G06F 16/632; G06F 16/90335; G06F 16/904; G06F 16/907; G06F 16/9535; G06F 2111/10; G06F 30/20; G06F 40/216; G06F 40/253; G06F 40/263; G06F 40/42; G06F 40/44; G06F 1/00; G06F 3/00; G06F 5/00; G06F 8/00; G06F 7/00; G06F 9/00; G06F 11/00; G06F 12/00; G06F 13/00; G06F 15/00; G06F 16/00; G06F 17/00; G06F 18/00; G06F 21/00; G06F 30/00;
(Continued)

(56) References Cited

U.S. PATENT DOCUMENTS

| 7,685,194 B2 | 3/2010 | Kabra et al. |
| 9,075,843 B2 | 7/2015 | Gimbel |
| 9,104,967 B2 | 8/2015 | Dettinger et al. |

(Continued)

FOREIGN PATENT DOCUMENTS

CN 107403106 A 11/2017

OTHER PUBLICATIONS

Didriksen T., "Rule Based Database Access Control—A Practical Approach", 1997 pp. 143-151.
(Continued)

*Primary Examiner* — Shyue Jiunn Hwa
(74) *Attorney, Agent, or Firm* — Invoke (57) ABSTRACT

Systems for fine-grained control of query execution are disclosed. The system receives and stores access control rules to be applied to queries. The system applies access control rules to a received query to determine one or more actions corresponding to the received query. Based on the access control rules, the system can allow execution of the query without conditions, allow execution of the query under a set of conditions, or prevent execution of the query.

30 Claims, 7 Drawing Sheets

(58) Field of Classification Search
CPC . G06F 2119/00; G06F 2123/00; G06N 20/00; G06N 5/022; H04L 12/185; H04L 41/142
See application file for complete search history.

(56) References Cited

U.S. PATENT DOCUMENTS

| | | |
|---|---|---|
| 9,251,211 B2 | 2/2016 | Manzano Macho et al. |
| 2005/0246338 A1 | 11/2005 | Bird |
| 2018/0144064 A1* | 5/2018 | Krasadakis ....... G06F 16/90332 |
| 2021/0191943 A1 | 6/2021 | Chakra et al. |

OTHER PUBLICATIONS

Iyengar R., "Monitoring MySQL Problematic Queries", Retrieved from https://webyog.com/blog/monyog/monitoring-mysql-problematic-queries/, Sep. 11, 2017, pp. 18.

Mauri et al., "Practical Use of Tables and Indexes", 2021, pp. 340.

\* cited by examiner

```
"queryPatterns": [
    {
        "id": "basicQuery",
        "pattern": "QUERY USING SELECT_CLAUSE ONCE AND FROM_CLAUSE ONCE AND
        WHERE_CLAUSE ONCE AND GROUB_BY_CLAUSE ONCE",
        "description": "Basic queries using select clause, from clause, where clause and group by
clause only once in their queries"
    },
    {
        "id": "queryWithAggregations",
        "pattern": "QUERY USING AGGREGATIONS FROM (SUM, MIN, MAX)",
        "description": "Queries using basic aggregations"
    }
    {
        "id": "queryWithJoins",
        "pattern": "QUERY USING JOINS",
        "description": "Queries trying to joins"
    }
],
"rules": [
    {
        "rule": "ALLOW QUERY_EXECUTION IF QUERY_PATTERN = 'basicQuery' AND
QUERY_PATTERN = 'queryWithAggregations'",
        "description": "Allow execution for basic queries using basic aggregations"
    },
    {
        "rule": "SET QUERY_TIME_OUT AS 30 SECONDS IF QUERY_PATTERN = 'queryWithJoins'",
        "description": "Force a special time out for queries using joins"
    },
    {
        "rule": "ALLOW QUERY_EXECUTION IF QUERY_PATTERN = 'queryWithJoins' AND
QUERY_COUNT < 1000 WITHIN 5 MINUTES",
        "description": "Set a special query execution count for queries using joins"
    },
    {
        "rule": "SET MAX_RESULT_SET_SIZE AS 1000 IF QUERY_PATTERN = ANY",
        "description": "Force a result set count to a maximum of 1000 regardless of what ie being
returned requested in the query"
    }
```

400

403 — basicQuery block
405 — queryWithAggregations block
407 — queryWithJoins block
409 — first rule
411 — second rule
413 — third rule
415 — fourth rule

RULE-BASED QUERY CONTROL

TECHNICAL FIELD

The present disclosure relates to database management, and, more specifically, to controlling processing of database queries.

BACKGROUND

Query languages are used to extract information from databases and information systems. Using a query language, such as the Structured Query Language (SQL), users can retrieve, manipulate, and transform data in relational databases. A relational database is a collection of related tables with a fixed number of named columns and any number of rows of data. Queries are textual statements requesting retrieval of a particular set of data from relational databases.

Database management involves controlling access of information in databases by queries to maintain security, performance, and other operational parameters. Some access control techniques place few, if any, restrictions on queries. However, the techniques may only offer administrators high level control over the information accessed by the queries. For example, access control policies may restrict users' connection to particular databases and information users can access. Some other access control techniques give administrators full control over queries made to databases, but allow little or no flexibility for users to construct queries tailored to the users' individual purposes. Also, the techniques typically implement restrictions on case-by-case bases. As a result, the techniques can be costly and time consuming to develop and maintain.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

Embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:
A. GENERAL OVERVIEW
B. SYSTEM ENVIRONMENT
C. SYSTEM ARCHITECTURE
D. QUERY CONTROL PROCESS
E. EXAMPLE EMBODIMENT
F. HARDWARE OVERVIEW
G. MISCELLANEOUS; EXTENSIONS

A. General Overview

One or more embodiments implement fine-grained control for the execution of queries. The system receives and stores access control rules to be applied to queries. The access control rules may include user-defined rules that are different from and in addition to a set of validation rules. The system applies the access control rules to a received query to determine one or more actions corresponding to the received query. Based on the access control rules, the system may, for example, allow execution of the query without conditions, allow execution of the query under a limiting set of conditions (e.g., time or resource limits), or prevent execution of the query. Furthermore, the system may present warnings and/or information in relation to the received query. The system may reject a request to execute a query, which is otherwise valid (e.g., authorized for a requesting user and executable on a database), based on the application of stored rules to the query.

While this General Overview subsection describes various example embodiments, it should be understood that one or more embodiments described in this Specification or recited in the claims may not be included in this subsection.

B. System Environment

Figure 1:
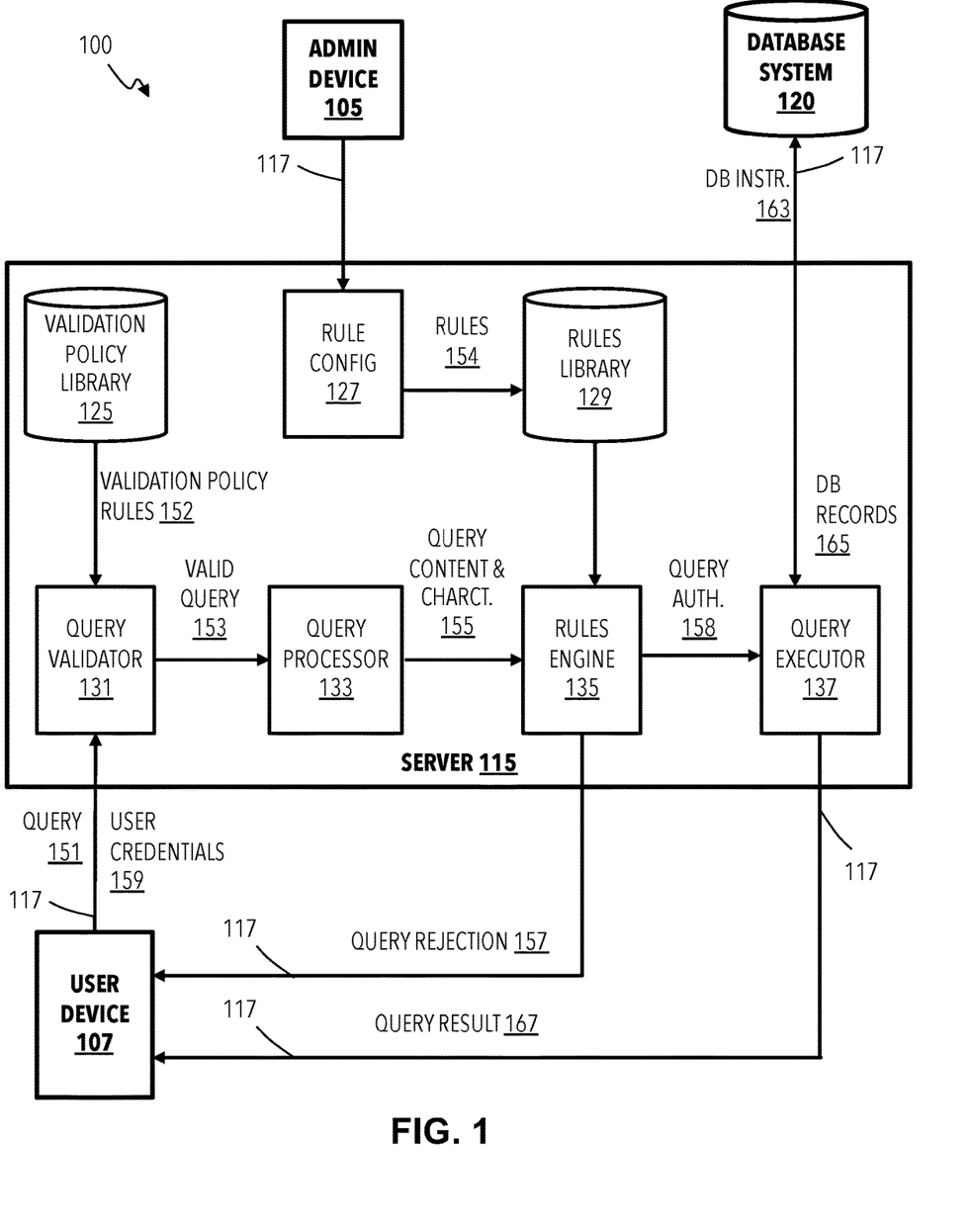
FIG. 1 illustrates a functional flow block diagram of an example system in accordance with one or more embodiments.

FIG. 1 shows a system block diagram illustrating an example of a computing environment 100 for implementing systems and processes in accordance with one or more embodiments. The computing environment 100 includes one or more administrator devices 105, one or more user devices 107, a server 115, and a database system 120 communicatively connected, directly or indirectly via one or more communication links 117. The communication links 117 can be wired and/or wireless information channels, such as the Internet, an intranet, an Ethernet network, a wireline network, a wireless network, a mobile communications network, and/or another communication network.

The database system 120 can be a system that stores and maintains one or more databases. The database system 120 can comprise one or more hard disk drives, flash drives, or the like. The database can be any type of database, such as a hierarchical database, network database, or a relational database, such as an SQL database.

The administrator device 105 and the user device 107 can be one or more client computing devices allowing users to access and interact with the server 115 and/or the database system 120. For example, the administrator device 105 and the user device 107 can be personal computers, workstations, servers, mobile devices, mobile phones, tablet devices, and/or other processing devices capable of implementing and/or executing server processes, software, applications, etc. The administrator device 105 and the user device 107 can include one or more processors that execute software or other computer-readable instructions and may include a memory to store the software, other computer-readable instructions, and data. The administrator device 105 and the user device 107 can also include a communication device to communicate with the server 115 and the database system 120 via the communication links 117. Additionally, the administrator device 105 and the user device 107 can generate a computer-user interface enabling a user to interact with the server 115 and the database system 120 using input/output devices. For example, by way of the computer-user interface, a user of the user device 107 can connect to the database system 120 via the server 115 to code and submit a query 151 for accessing data, such as tables and records, maintained by the database system 120.

The server 115 can be one or more computing devices that manage communication, access, and operations among the administrator device 105, the user device 107, and the database system 120. One or more embodiments of the server 115 include a validation library 125, a rule configurator 127, a rules library 129, a query validator 131, a query processor 133, a rules engine 135, and a query executor 137.

The validation library 125 can store validation rules 152 for one or more users or clients of the server 115 and/or the database system 120. The validation rules 152 can specify users that may access the database system 120, circumstances under which the users can access the database system 120, and information in the database system 120 the users are authorized to access. For example, the validation rules 152 may restrict access to some or all information stored in the database system 120 based on a users' and/or a clients' authorization, role, competence, authority, obligation, conflict-of-interest, and the like.

The rule configurator 127 can be an application or module for configuring rules 154 for controlling query execution in the database system 120. One or more embodiments can receive inputs from a user of the administrator device 150 including rules 154 for controlling retrieval of information from the database system 120. For example, the rule configurator 127 can receive the rules 154 constructed via inputs to a computer-user interface or via a predefined library recorded on storage device. The rules 154 can be applied based on the content and/or characteristics of a query 151. The rules 154 can comprise criteria and actions. An individual rule can define a mapping between a one or more criteria and one or more actions. The criteria can be based on syntax, semantics, operations, target data, and computing resources of a query 151. Example criteria can include:
  (1) query semantics, such as QUERY USING JOINS
  (2) query plan, such as: QUERY DOING A FULL TABLE SCAN
  (3) target data of a query, such as: QUERY USING COLUMN A
  (4) past performance of same or similar queries, such as: QUERY USING A PARTICULAR OPERATION ON A TABLE HAVING AVERAGE RESPONSE TIME OF MORE THAN 10 SECONDS
  (5) Current status of a system executing a query, such as: NUMBER OF PARALLEL QUERY EXECUTIONS USING JOINS Actions can specify one or more operations to perform based on a corresponding query matching a criterion. Actions can function to, for example: prevent execution, limit execution, limit resources consumed, limit results returned, and generate alerts. Example actions can include:
  (1) Reject execution of a query
  (2) Execute a query
  (3) Execute a query with a specific time out
  (4) Execute a query with a limit on the total number of queries that can be executed
  (5) Lock out the user
  (6) Trigger a notification, such as an alarm, alert, or the like The rule configurator 127 can also generate mappings between one or more criteria and one or more corresponding actions, and store the mapping in the mapping in, for example, the rules library 129. An example rule mapping a criterion to an action can be, for example:
  IF QUERY_PATTERN USING JOINS:DENY QUERY_EXECUTION The query validator 131 can be a software application or module that validates database queries, such as the query 151 based on user credentials 159 received from the user device 107 and validation rules 152 stored in the validation library 125. The query validator 131 can determine which, if any, information in the database system 120 a user or client is permitted to and/or prohibited from accessing. For example, the validation library 125 can include information identifying particular tables, rows, or records a user is forbidden to access. In response to determining that the query 151 requests unauthorized information, the query validator 131 can invalidate the query. On the other hand, in response to determining that the query 151 is authorized, the query validator 131 can validate the query 151 and pass the valid query 153 to the query processor 133.

The query processor 133 can be a software application or module that determines content of the query 153, characteristics of the query 153, characteristics of the user requesting the query 153, and characteristics of the database system 120. Content of the query 153 can include operations contained in the query and data requested by the query 153, such as: a quantity and types of joins in the query; a quantity and types of functions in the query; a quantity and types of conditions in the query; a quantity and types of operations in the query; a quantity and types of clauses in the query; a quantity and the types of keywords in the query; a quantity, nested level, and types of sub-queries in the query; a quantity and types of columns used in the query; querying a time series table; and inclusion of time predicates. One or more embodiments of the system determine the contents by parsing the query 153 and creating a parse tree using a query language grammar (e.g., SQL syntax). For example, using a parser, the system can convert the query into a string of elements (e.g., tokens indicating database operations and data), and using a grammar (e.g., grammar 211 below), determine the syntax and semantic patterns of the elements.

The characteristics of the query can include information describing execution of the query 153, including time, resource consumption, result size, and the like. For example, the characteristics can include information from one or more query plans, including instructions for executing the query (e.g., database instructions 163), an estimated resource cost for executing the query (e.g., startup cost and total cost), an amount of information included in the query result (e.g., quantity of rows, average bytes of information per row, and total number of bytes of information). The characteristics of the query 153 can also include query history information such as an average time taken in the past for a particular criterion. Example characteristics of the query 153 can be a number of rows in the target of the query, a number of rows accessed in the target of the query, a number of rows to be returned by the query, an amount of data to be processed for the query, the query causing a full table scan, a query response time for execution of the query, resource usage for execution of the query, and a time for execution of the query.

The characteristics of the user can include usage information and resource consumption by the user. For example, characteristics of the user can include an average time taken for the user's queries, an average size of a results retrieved by the user, and an average amount of computing resources consumed by the user over one or more time frames (e.g., hour, day, month, quarter, or year).

The characteristics of the system can include computing resources currently available or predicted to be available for executing queries. Currently available resources can be determined using characteristics of a current state of the system obtained from a resource management tool. Predicted resources can be determined using historical characteristics of past states of the system from the resource management tool, which can be used to predict a future state of the system. For example, the characteristics can include usage metrics, health metrics, query characteristics, previous query execution plan characteristics, query characteristics of individual users, and available computing resources. Computing resources can include, for example, resources available, resources occupied, quantity of queries currently being executed, and current execution time (e.g., average query execution time or maximum query execution time). For example, the system can determine a number of parallel queries of a particular criterion getting executed at the same time.

The rules engine 135 can be a software application or module that determines whether to reject, execute, or conditionally execute queries by applying the rules 154 stored by the rules library 129 to the query content and characteristics 155 determined by the query processor 133. One or more embodiments of the rules engine 135 apply the rules 154 to the query content and characteristics 155 determined by the query processor 133. For example, the rules library 129 can include a rule specifying that execution of queries including join operations should be rejected. Based on the rules, the rules engine 135 can perform actions defined by the rules. If a rule 154 specifies the validated query 153 should be rejected, then the rules engine 135 can refrain from forwarding the query 153 to the query executor 137 and, instead, communicate a query rejection 157 to the user device indicating the rejection of the query 153, the reasons for the rejection, and any actions taken in association with the rejection, such a locking out the user and alerting administrators. Additionally, some embodiments can communicate the rejection to the administrator device 105. On the other hand, if the rules engine 135 determines the query 153 is authorized without conditions, the rules engine 135 can communicate a query authorization 158 to the query executor 137. Also, if the rules engine 135 determines the query 153 is authorized with conditions, the query authorization 158 can include information specifying the conditions (e.g., a maximum quantity of results and maximum query execution time).

The query executor 137 can be a software application or module that controls the storage, organization, and retrieval of data from database system 120 based on query 153. The query executor 137 can generate database instructions 163 for retrieving database records 165 from the database system 120 to communicate a query result 167 for the user device 107. One or more embodiments of the query executor 137 generate the query instructions 163 including conditions or restrictions in accordance with the rules applied by the rules engine 135. Based on the conditions or restrictions, the query result 167 can be a limited set of records in comparison to a query result 167 generated without conditions or restrictions. For example, based on the restrictions and conditions, the query result 167 can be limited to 1000 records; whereas an unconditional or unrestricted result could include a substantially unlimited quantity of records.

FIG. 1 illustrates the server 115 including the rule configurator 127, the validation library 125, the rules library 129, the query validator 131, the query processor 133, the rules engine 135, and the query executor 137. It is understood that one or more of the components of the server 115 can be combined. Additionally, it is understood that one or more of the components can be included in or combined with a system other than the server 115. For example, one or more embodiments may combine the components of the server into the database system 120.

C. System Architecture

Figure 2:
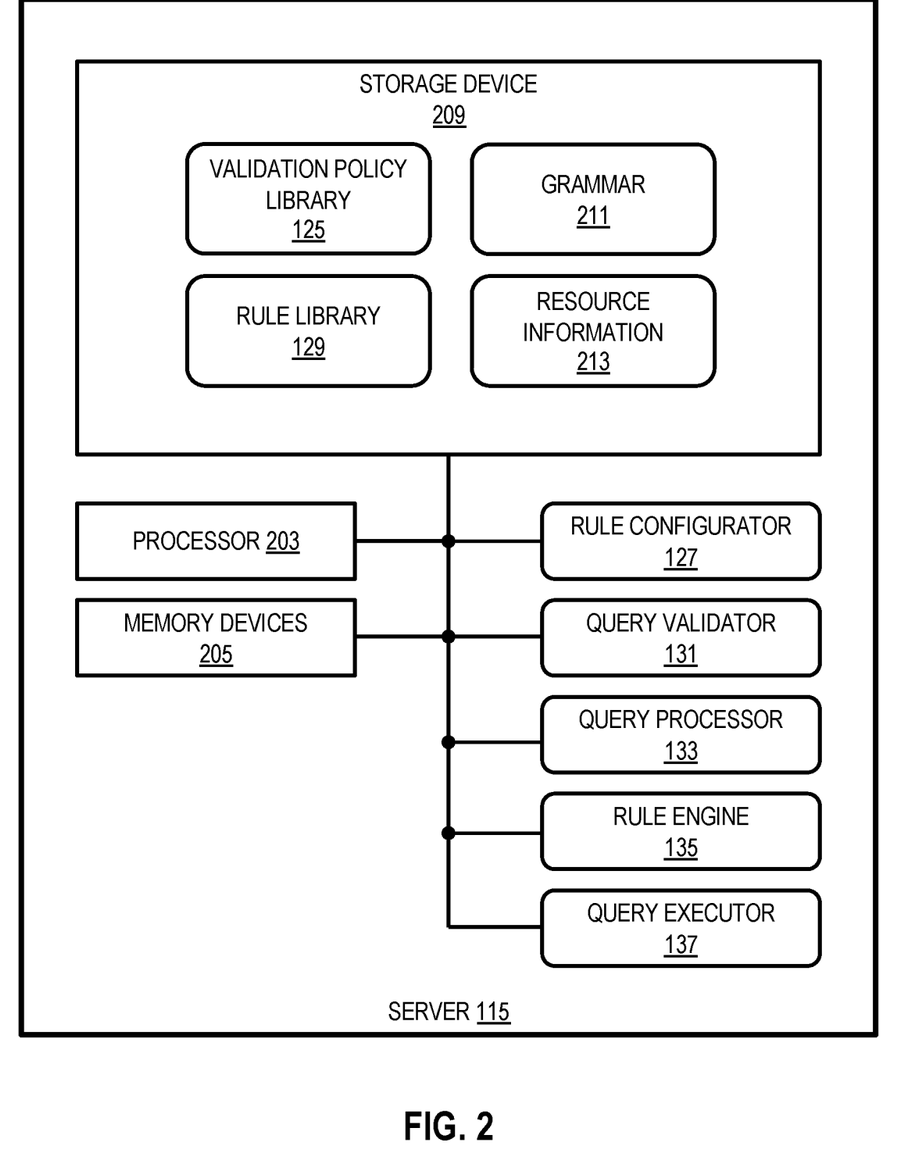
FIG. 2 illustrates a block diagram of an example system in accordance with one or more embodiments.

FIG. 2 shows a system block diagram illustrating an example of a server 115 in accordance with one or more embodiments. The server 115 can be the same or similar to that described above. The server 115 includes hardware and software that perform the processes and functions disclosed herein.

Embodiments of the server 115 can include a processor 203, one or more memory devices 205, and a storage device 209. The processor 203 can be one or more general-purpose processors, special-purpose processors, or other programmable data processing apparatuses providing the functionality and operations detailed herein. The memory device 205 and storage device 209 can be operatively and/or communicatively connected to the processor 203. In some implementations, the memory device 205 and/or the storage device 209 includes one or more types of memory structures. For example, the memory structures can include random access memory (RAMs) units, read only memory (ROMs), flash memory (e.g., solid state drives (SSDs)), electrically erasable/programmable read only memory (EEPROMs), etc. It should be appreciated that communication between the memory device 205, the storage device 209, and the processor 203 or another controller, encompasses the processor or controller accessing the memory device 205 and/or the storage device 209, exchanging data with the memory device 205 and/or the storage device 209 (e.g., reading/writing data to the memory device 205), or storing data to the memory device 205 and/or the storage device 209.

The storage device 209 can store a validation library 125 and rule library 129, which can be the same or similar to those previously described above. The storage device 209 can also store a grammar 211 and resource information 213. The resource information 213 can be a log of information of current and past queries executed on a database (e.g., database system 120). The statistics can include information indicating types of and quantities of queries executed on the database system 120 by the system and by particular users. The statistics can also include information quantifying resources consumed by the queries and results generated by the queries.

The processor 203 can also execute computer-readable program instructions of a rule configurator 127, a query validator 131, a query processor 133, a rule engine 135, and a query executor 137, all of which can be the same or similar to those previously describe above. It is understood that functionality of one or more of the rule configurator 127, the query validator 131, the query processor 133, the rule engine 135, and the query executor 137 can be combined into a common software module and/or divided between additional modules.

It is noted that the server 115 can comprise any general-purpose computing article of manufacture capable of executing computer program instructions installed thereon (e.g., a personal computer, server, etc.). However, the server 115 is only representative of various possible equivalent-computing devices that can perform the processes described herein. To this extent, in embodiments, the functionality provided by the server 115 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Multiple components may be combined into one application and/or machine. Operations described with respect to one component may instead be performed by another component.

D. Query Control Process

Figure 3A:
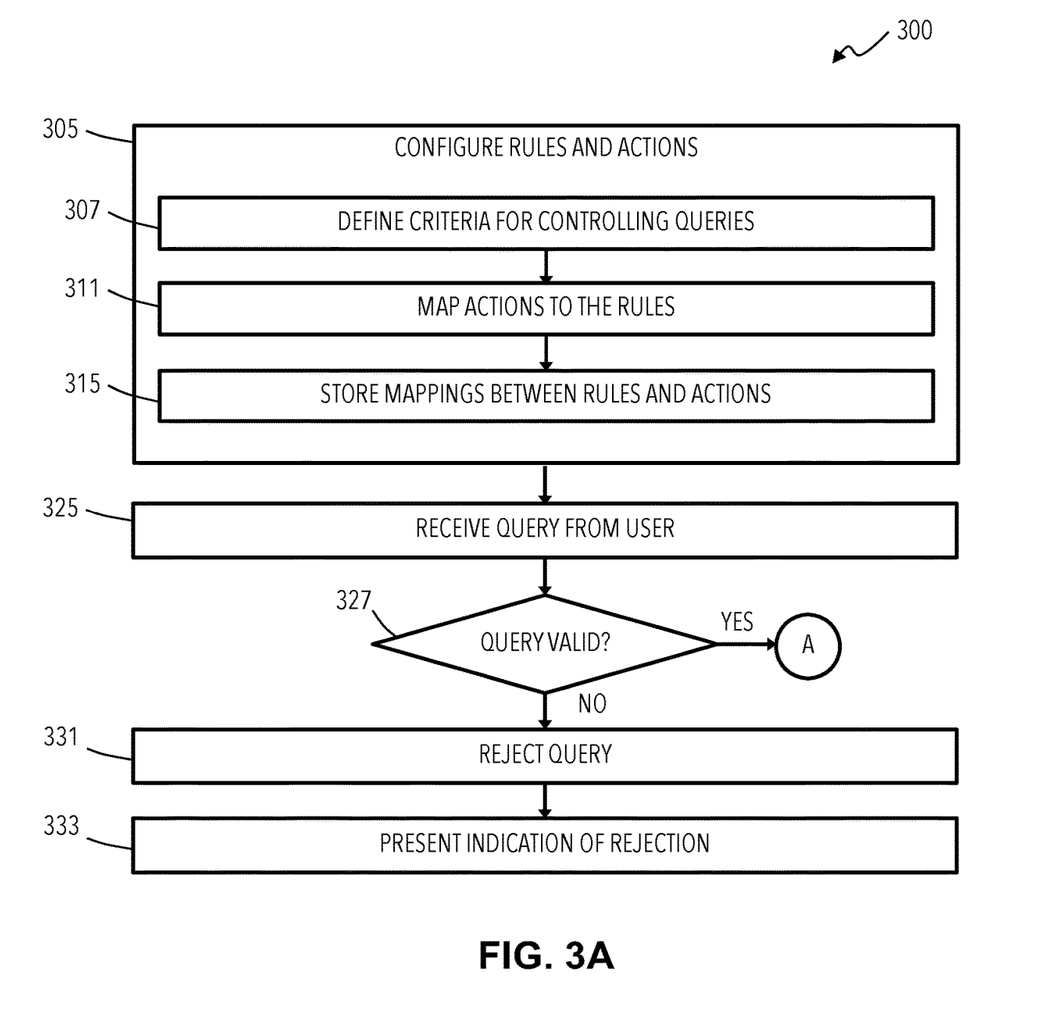
FIGS. 3A, 3B, and 3C illustrate a set of operations of an example process for augmenting existing data set for training and validating a machine learning model in accordance with one or more embodiments.
Figure 3B:
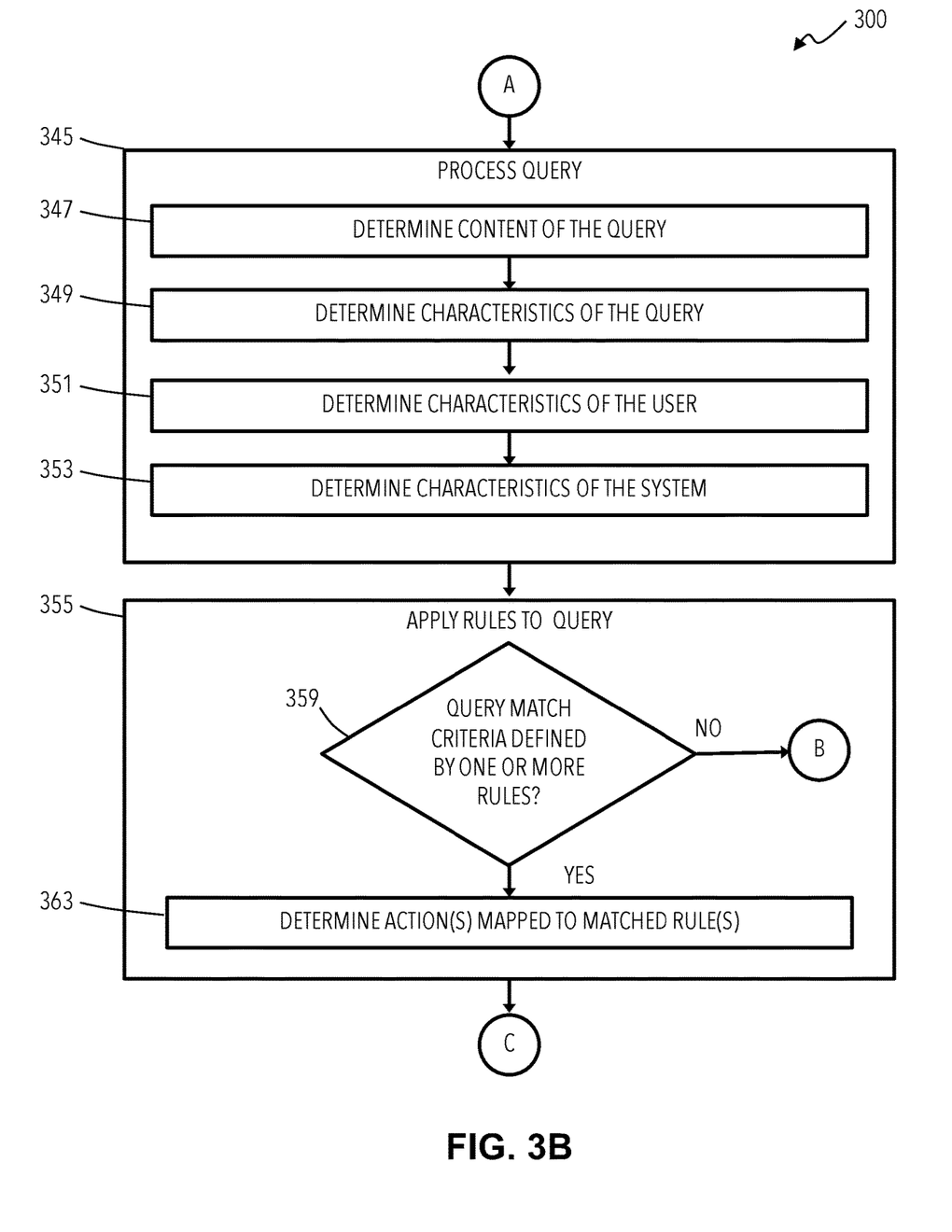
Figure 3C:
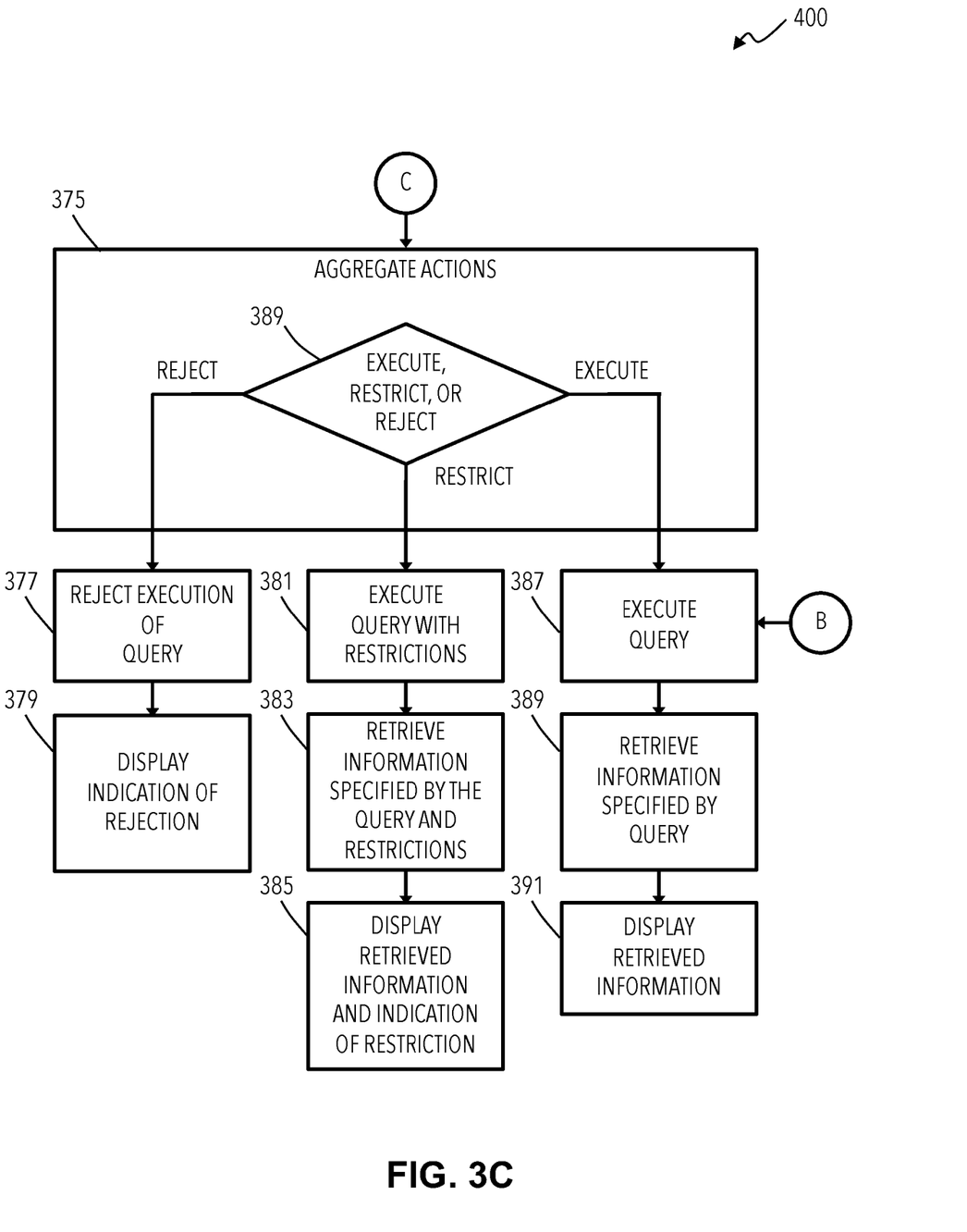

The flow diagrams in FIGS. 3A-3C illustrate functionality and operations of systems, devices, processes, and computer program products according to various implementations of the present disclosure. Each block in FIGS. 3A-3C can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A-3C. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

Referring to FIG. 3A, at block 305, a system (e.g., server 115 executing rule configurator 127) configures rules (e.g., rules 154) for controlling execution of queries. Configuring the rules can include, at block 307, define criteria for controlling queries from a user. For example, an administrator (via, e.g., administrator device 105) can input the rules using a code editor application, retrieve the rules from a preestablished library, or upload a file containing predefined rules. As previously described above, rules can comprise criteria mapped to actions. The criteria can identify include syntax and semantic patterns of queries; query plans, past history of queries (e.g., past execution history of same criteria, user history of query execution), system status (e.g., system resource usage, system time of execution). For example, rules can specify a number of joins in a query, a level of nested sub-queries, a number of rows in a table, whether the query includes a rank operation on a particular column of a table, a time predicate for a time series table, an average query response time for a particular table, and an average query response time for a view associated with a query.

Configuring the rules can also include, at block 311, mapping one or more actions to the criteria defined at block 307. As previously described above, the actions can include operations controlling the system to reject queries, execute queries, or execute queries with conditions and/or restrictions. The actions can be implemented before, during, or after execution of the queries. For example, actions can include: a time limit for execution of a query, a set of resources that may be accessed by a query, a number of queries that may be concurrently executed with another query, computing resources involved in executing the query, and computing resources available for executing the query. Additionally, one or more embodiments can implement different rules before, during, or after query execution. For example, a first rule can set a time limit (e.g., 10 seconds) before execution of a query, and a second rule can modify the time limit during the execution.

The system can obtain the actions in a same or similar manner as the criteria. Some embodiments can receive a table mapping the criteria with one or more corresponding actions as a table file. Some embodiments can be an interactive graphic user interface for constructing rules, associating the criteria with one or more actions, and checking the rules for syntactic errors. Configuring the rules can also include, at block 315, stores the mapping between the criteria and corresponding actions. For example, the system can store and maintain the mapping in a library (e.g., rules library 129.)

At block 325, the system can receive a query (e.g., query 151) from a user of a user device (e.g., user device 107). For example, a developer can input a query in a user interface of a code editor and submit the query to the system for execution. At block 329, the system (e.g., executing query validator 131) can determine whether the query received at block 325 is valid. One or more embodiments validate the query using one or more access rules (e.g., validation rules 152 stored in the validation library 125) restrict access to some or all information stored in the database system 120. For example, the system can compare user credentials (e.g., credentials 159, such as authorization, role, competence, authority, obligation, and conflict-of-interest) to the access rules. If the query is not valid (e.g., block 327 is "No"), then at block 331 the system can reject the query and, at block 333, present information indicating the rejection of the query via the user device. For example, via a graphic computer-user interface, the system can generate a response to the query indicating that the user is not authorized to execute the query or to access data requested by the query. On the other hand, if the system determines that the received query is valid (e.g., block 327 is "Yes"), then the process 300 proceeds to block 345 on FIG. 3B, as indicated by off-page connector "A."

At block 345, the system (e.g., executing query processor 133) can process the query validated at block 327. Processing the query can include determining content of the query, characteristics of the query, characteristics of the user, and characteristics of the system. Some embodiments receive the request to process the query from the user via the computer-user interface. Other embodiments automatically execute the query based on successful validation at block 327. Processing the query can include, at block 347, determining content of the query, such as the syntax and sematic patterns of the query. For example, using a parser, the system can convert the query into a string of elements (e.g., tokens) and using a grammar (e.g., grammar 211), determine syntax and semantic patterns of the elements.

Processing the query can also include, at block 349, determining characteristics of the query, such as resources involved in executing the query. For example, using a query optimizer, the system can determine one or more query plans for executing the query. The query plan can include an estimated resource cost for executing the query (e.g., startup cost and total cost), an amount of information included in the query result (e.g., quantity of rows, average bytes of information per row, and total number of bytes of information). Query characteristics can also include historical information logged from past queries of the same type. For example, the historical information can include execution time, resource consumption, and result size.

Processing the query can further include, at block 351, determining characteristics of the user requesting the query, such as user history information. User history can include usage information and resource consumption information consumed by queries of the user within one or more time frames. One or more embodiments can maintain a log of each query executed by the user within the last hour, day, week, or the like, along with corresponding quantities of time, computing resources, and data consumed by the queries.

Processing the query can additionally include, at block 353, determining characteristics of the system, such as system resources. Determining system resources can include, for example, resources available, resources occupied, quantity of queries currently being executed, and current execution time (e.g., average query execution time, maximum query execution time). One or more embodiments determine the system resources information based on the received query. For example, the system can determine a number of parallel queries of a particular criterion executed at the same time. The resource information can include current resource availability. Additionally, the resource information can include past resource consumption. For example, the system can retrieve past information of queries including operations and data the same or similar to the query.

At block 355, the system (e.g., executing rules engine 135) can apply one or more of the rules configured at block 305 to the query validated at block 327 based on the contents and characteristics determined at block 345. Applying the rules can include, at block 359, determining whether the query meets one or more of the criteria defined by the rules. If no matching criteria are identified (e.g., block 359 is "No"), the process 300 can proceed to block 387 of FIG. 3C, as indicated by off-page connector "B." If the system determines one or more matching criteria at block 359, then at block 363, the system can determine actions mapped to the one or more matching criteria.

Referring to FIG. 3C, as indicated by off page connector "C," at block 375 the system can aggregate any actions determined at block 363. Aggregating the actions can include, at block 389, determining whether the one or more actions specify the valid query should be rejected, executed without restrictions, or executed with restrictions. The determination at block 389 can be based on the most restrictive option included in the one or more actions determined for the query. If any action of the one or more actions determined at block 361 indicates the query is rejected (e.g., block 389 is "reject"), then the process 300 proceeds to block 377, as described below. If none of the one or more actions indicates the query is rejected, but at least one indicates the query is restricted (e.g., block 389 is "restrict"), then the process proceeds to block 381, as described below. If none of the one or more actions indicates the query is rejected or restricted or all of the actions indicate the query should executed (e.g., block 389 is "execute"), then the process proceeds to block 381, as described below.

For example, if a first action corresponding to a first criterion matching the query indicates the query can be executed, a second action corresponding to a second criterion matching the query indicates the query should be restricted, and a third action corresponding to a third criterion matching the query indicates the query should be rejected, then the most restrictive option would be to reject the query. Accordingly, at block 389, the system can reject the query and proceed to block 377. In another example, if a first action corresponding to a first criterion matching the query indicates the query can be executed, a second action corresponding to a second criterion matching the query indicates the query should be restricted, then the most restrictive option would be to restrict the query. Accordingly, at block 389, the system can restrict the query and proceed to block 377.

At block 377, the system can reject the execution of the query based on the determination at block 389. Rejecting execution can prevent generation or execution of any instructions (e.g., database instructions 163) or retrieving information from the database. Rejecting execution can also prevent consumption of substantially any computing resources of the system or the database that would be involved in executing the query. At block 379, the system can display an indication of the query rejection (e.g., query rejection 157) to the user (e.g., user device 107) via a computer-ser interface (e.g., a user interface). The indication can also include a description of the reasons for the rejection based on the corresponding action.

At block 381, the system can execute the query with each of the restrictions indicated by the actions determined at block 361. As previously described, the restrictions can specify a time limit for execution of the query, a set of resources that may be accessed by the query, and a number of queries that may be concurrently executed with the query, computing resources involved in executing the query, and computing resources available for executing the query. At block 381, the system can retrieve information from the database in accordance with the restrictions identified at block 389. At block 385, the system can present the query results (e.g., query results 167) to the user via the computer-ser interface), along with an indication describing the restrictions imposed on the results. For example, the system can indicate that execution of the query was limited to 30 seconds and 1,000 results.

At block 387, the system can execute the query without restrictions or conditions. At block 389, the system can retrieve information from the database. And, at block 385, the system can present the query results to the user.

E. Example Embodiment

Figure 4:
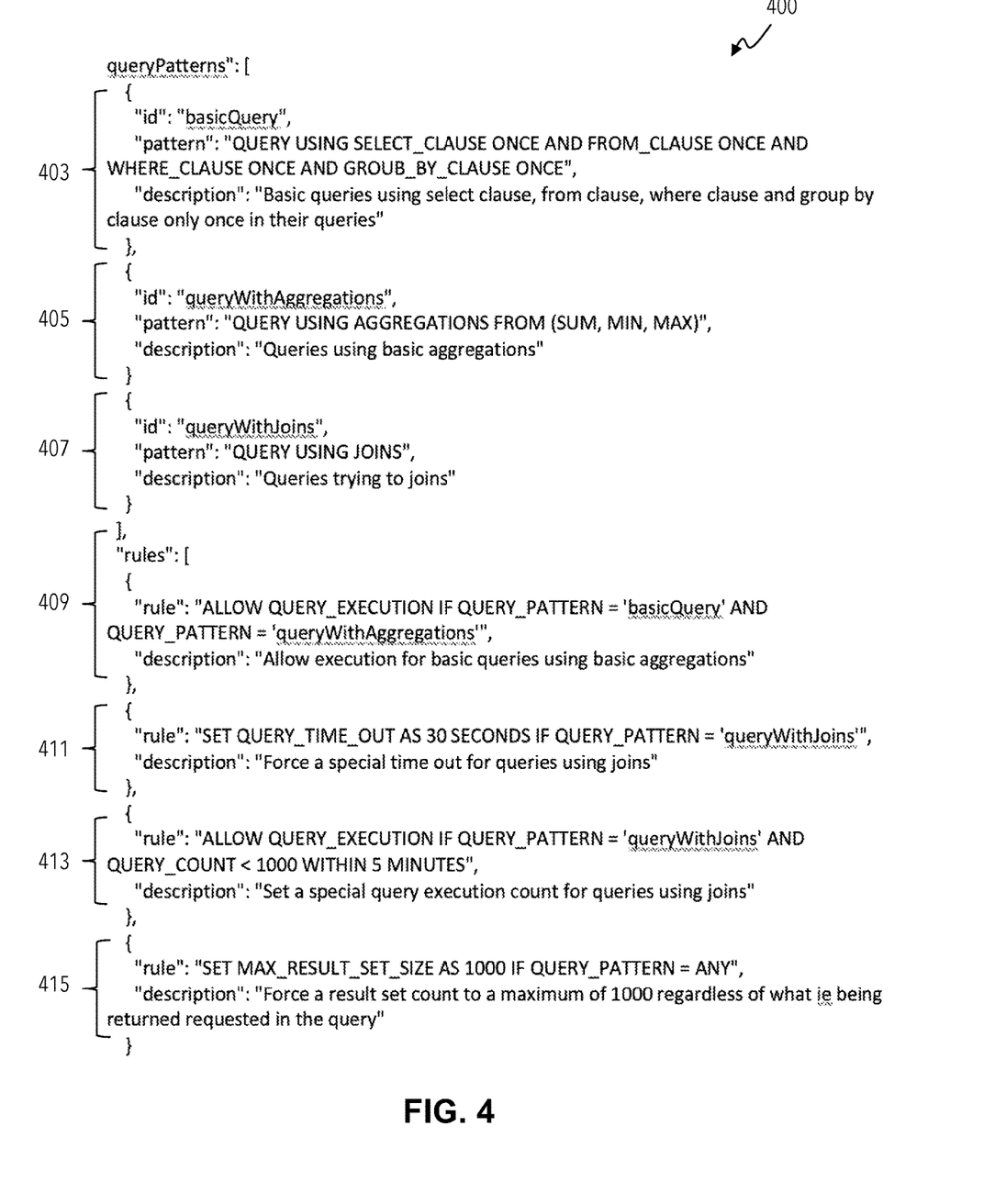
FIG. 4 illustrates an example data structure including criteria and rules in accordance with one or more embodiments.

FIG. 4 illustrates an example data file 400 specifying example criteria 403, 405, and 407, and example rules 409, 411, 413, and 415. Criterion 403 identifies "Basic queries using select clause, from clause, where clause and group by clause only once in their queries." Criterion 405 identifies "Queries using basic aggregations." Criterion 407 identifies "Queries using joins."

Rule 409, "Allow execution for basic queries using basic aggregations," maps the action "allow query execution" if the query matches criteria 403 and 405. Rule 411, "Force a special time out for queries using joins," maps the action "set query time out as 30 seconds" if the query matches criterion 407. Rule 413, "Set a special query execution count for queries using joins," maps the action "allow query execution" if the query matched criterion 403 and the estimated query count will be less than 1000 within 5 minutes. The system can determine the estimated query count and time constraints based on determinations of the characteristics of the query and the current system resources. Rule 415, "Force a result set count to a maximum of 1000 regardless of data requested in the query," maps the action "set maximum result size to 1000 records" for any query.

As previously described, in response to a query matching criteria included one of the rules 409, 411, 413, and 415, the system performs one or more actions mapped to the matched criterion. For example, a query can state, "SELECT NAME, EMP_NO FROM EMPLOYEES. Based on the content of the query (e.g., determined by query processor 133), the system can determine that only the criterion of rule 415 ("QUERY_PATTERN=ANY") matches the query. Accordingly, as indicated by rule 415, the system can generate and execute database instructions (e.g., database instructions 163) restricting the retrieved records (e.g., database records 165) based on the action "set maximum result size to 1000 records".

In another example a query can state, "SELECT NAME, AVG(SALARY) FROM DEPT GROUP BY NAME." Based on the content of the query, the system can determine that none of the rules 409, 411, 413, and 415 include criteria matching the query. Notably, the query includes the aggregation "AVG," which is similar to the aggregations in rule 405 (e.g., SUM, MIN, MAX). However, as the query does not match criteria of any of the rules 409, 411, 413, and 415, the system can reject execution of the query.

In a further example, a query can state, "SELECT LEAVES.LEAVE ID, EMPLOYEES.EMP_NAME, LEAVES.LEAVEDATE FROM LEAVES INNER JOIN EMPLOYEES ON LEAVES.EMP_ID=EMPLOYEES.EMPLOYEE_ID."
Based on the content of the query, the system can determine that the query matches criteria of rules 411, 413, and 415. Accordingly, the system can perform the actions specified by each of the rules 411, 413, and 415, which include "Allow query execution, if not more than 1000 executions have happened in the last 5 minutes," "Set they query time out to 30 seconds," and "Limit the result set rows to 1000."

F. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
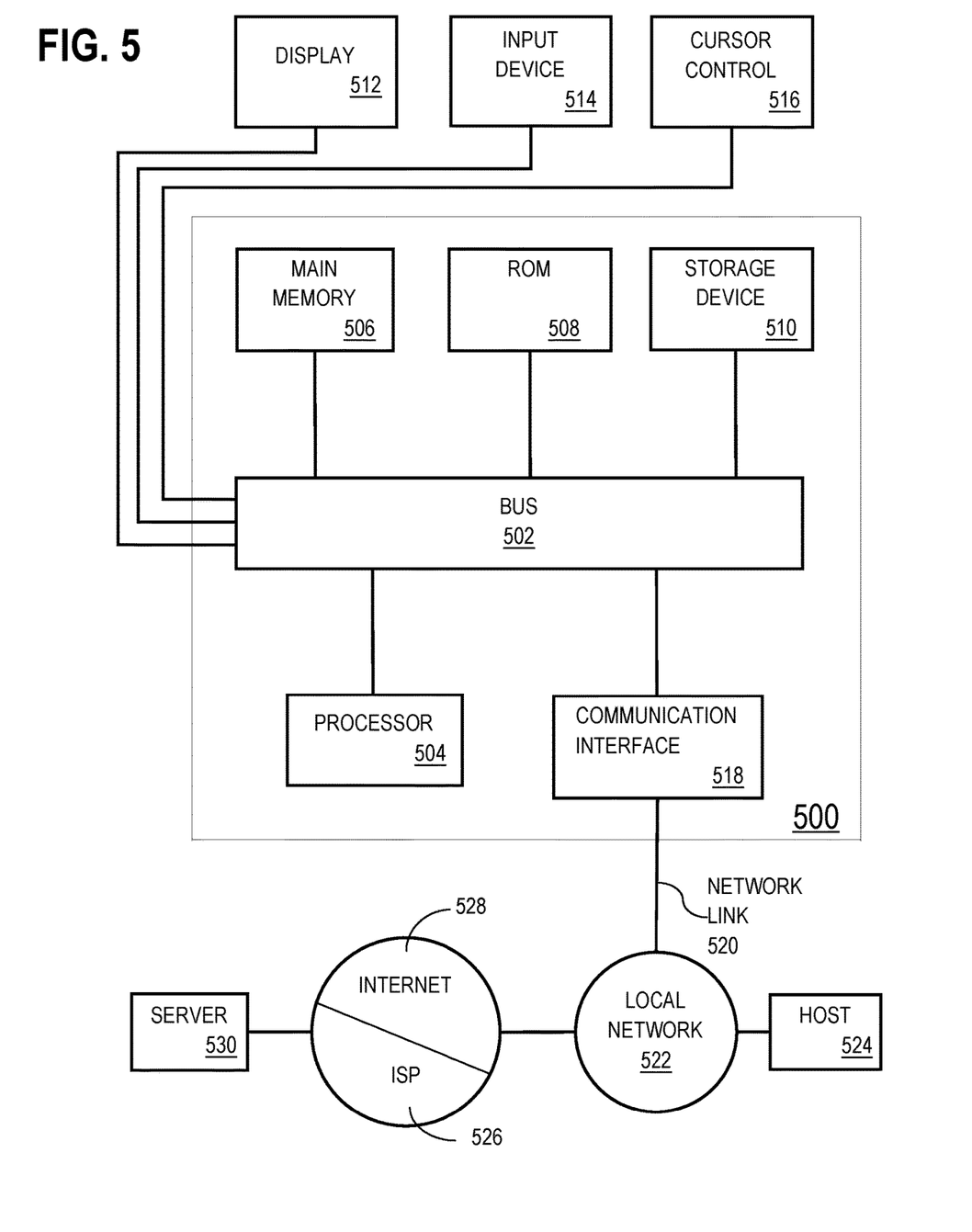
FIG. 5 shows a block diagram illustrating an example computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

G. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
receiving a plurality of rules to apply to queries for configuring a respective plurality of actions corresponding to the queries;
storing the plurality of rules to apply to the queries;
receiving, from a first user via a computer-user interface, a first request to execute a first valid query on a first database, the first valid query comprising a first plurality of elements;
selecting a first subset of the plurality of actions for application to the first valid query by applying the plurality of rules to a first set of characteristics corresponding to the first valid query, wherein:
the first subset of the plurality of actions comprises a first action, and
the first action comprises execution of the first valid query on the first database without limitations conditioning or restricting execution of the first valid query;
based on the first action, executing the first valid query;
receiving, from the first user via the computer-user interface, a second request to execute a second valid query on the first database, the second valid query comprising a second plurality of elements;
selecting a second subset of the plurality of actions for application to the second valid query by applying the plurality of rules to a second set of characteristics corresponding to the second valid query, wherein:
the first set of characteristics is different than the second set of characteristics, and
the first subset of the plurality of actions is different than the second subset of the plurality of actions,
the second subset of the plurality of actions comprises a second action of the plurality of actions, the second action comprises an operation controlling the second valid query on the first database to execute with a limitation, and the limitation specifies a condition or a restriction on execution of the second valid query; and based on the second action, executing the second valid query on the first database in accordance with the condition or the restriction specified by the limitation.

2. The non-transitory computer readable medium of claim 1, wherein:

receiving the first request to execute the first valid query comprises determining a first query is authorized based on one or more validation policies for a first user; and receiving the second request to execute the second valid query comprises determining a second valid query is authorized based on the one or more validation policies for the first user.

3. The non-transitory computer readable medium of claim 1, wherein applying the plurality of rules to the first set of characteristics corresponding to the first valid query to select the first action of the plurality of actions comprises:

determining that the first valid query matches a stored criterion; and selecting the first action responsive to the first action being mapped to the stored criterion.

4. The non-transitory computer readable medium of claim 1, wherein:

the second set of characteristics corresponding to the second valid query comprise query language characteristics; and applying the plurality of rules to the second set of characteristics corresponding to the second valid query comprises:

determining the query language characteristics of the second valid query using a query language grammar, and triggering an action limiting execution of the second valid query based on a first rule of the plurality of rules, the first rule including one or more of the query language characteristics, wherein the query language characteristics include on one or more of:

a quantity and types of joins in the second valid query, a quantity and types of functions in the second valid query, a quantity and types of conditions in the second valid query, a quantity and types of operations in the second valid query, a quantity and types of clauses in the second valid query, a quantity and the types of keywords in the second valid query, a quantity, nested level, and types of sub-queries in the second valid query, a quantity and types of columns used in the second valid query, querying a time series table, and inclusion of time predicates.

5. The non-transitory computer readable medium of claim 1, wherein:

the second set of characteristics corresponding to the second valid query comprise query execution plan characteristics; and applying the plurality of rules to the second set of characteristics corresponding to the second valid query comprises:

determining the query execution plan characteristics of the second valid query; and triggering an action limiting execution of the second valid query based on a first rule of the plurality of rules, the first rule including one or more of the query execution plan characteristics, wherein the query execution plan characteristics include one or more of:

a number of rows in the first database, a number of rows accessed in the first database, a number of rows to be returned by the second valid query, an amount of data to be processed for the second valid query, the second valid query causing a full table scan, a query response time for execution of the second valid query, resource usage for execution of the second valid query, and a time for execution of the second valid query.

6. The non-transitory computer readable medium of claim 1, wherein the operations further comprise:

determining a current state, a predicted future state, and a past state of the first database; and triggering an action limiting execution of the second valid query based on a first rule of the plurality of rules, the first rule including one or more of the current state, the predicted future state, or the past state, wherein the current state, the predicted future state, and the past state include one or more of:

query language characteristics, query execution plan characteristics, query characteristics of the first user, and available computing resources.

7. The non-transitory computer readable medium of claim 1, wherein the operations further comprise:

receiving, from the first user via the computer-user interface, a third request to execute a third valid query on the first database, the third valid query comprising a third plurality of elements; and applying the plurality of rules to a third set of characteristics corresponding to the third valid query to select a third subset of the plurality of actions for application to the third valid query, wherein:

the first set of characteristics is different than the third set of characteristics, and the first subset of the plurality of actions is different than the third subset of the plurality of actions, the third subset of the plurality of actions comprises a third action of the plurality of actions, and the third action comprises executing the third valid query with a set of access control restrictions, wherein the set of restrictions comprises one or more of:

a time limit for execution of the third valid query, a set of resources that may be accessed by the third valid query, a number of rows that can be returned, locking out the user, and a number of queries that may be concurrently executed with the third valid query.

8. The non-transitory computer readable medium of claim 1, wherein:

the first valid query is directed to a first table of the first database; and the second valid query is directed to the first table of the first database.

9. The non-transitory computer readable medium of claim 1, wherein limiting the second valid query comprises rejecting execution of the second valid query on the first database.

10. The non-transitory computer readable medium of claim 1, wherein limiting the second valid query comprises restricting the second valid query during execution of the second valid query on the first database.

11. The non-transitory computer readable medium of claim 1, wherein limiting the second valid query comprises restricting the second valid query after executing the second valid query on the first database.

12. A method comprising:
   receiving a plurality of rules to apply to queries for configuring a respective plurality of actions corresponding to the queries;
   storing the plurality of rules to apply to the queries;
   receiving, from a first user via a computer-user interface, a first request to execute a first valid query on a first database, the first valid query comprising a first plurality of elements;
   applying the plurality of rules to a first set of characteristics corresponding to the first valid query to select a first subset of the plurality of actions for application to the first valid query, wherein:
      the first subset of the plurality of actions comprises a first action, and
      the first action comprises execution of the first valid query on the first database without limitations conditioning or restricting execution of the first valid query;
   based on the first action, executing the first valid query
   receiving, from the first user via the computer-user interface, a second request to execute a second valid query on the first database, the second valid query comprising a second plurality of elements;
   selecting a second subset of the plurality of actions for application to the second valid query by applying the plurality of rules to a second set of characteristics corresponding to the second valid query, wherein:
      the first set of characteristics is different than the second set of characteristics, and
      the first subset of the plurality of actions is different than the second subset of the plurality of actions,
      the second subset of the plurality of actions comprises a second action of the plurality of actions,
      the second action comprises an operation controlling the second valid query on the first database to execute with a limitation, and
      the limitation specifies a condition or a restriction on execution of the second valid query; and
   based on the second action, executing the second valid query on the first database in accordance with the condition or the restriction specified by the limitation.

13. The method of claim 12, wherein:
   receiving the first request to execute the first valid query comprises determining a first query is authorized based on one or more validation policies for a first user; and
   receiving the second request to execute the second valid query comprises determining a second valid query is authorized based on the one or more validation policies for the first user.

14. The method of claim 12, wherein applying the plurality of rules to the first set of characteristics corresponding to the first valid query to select the first action of the plurality of actions comprises:
   determining that the first valid query matches a stored criterion; and
   selecting the first action responsive to the first action being mapped to the stored criterion.

15. The method of claim 12, wherein:
   the second set of characteristics corresponding to the second valid query comprise query language characteristics; and
   applying the plurality of rules to the second set of characteristics corresponding to the second valid query comprises:
      determining the query language characteristics of the second valid query using a query language grammar, and
      triggering an action limiting execution of the second valid query based on a first rule of the plurality of rules, the first rule including one or more of the query language characteristics,
   wherein the query language characteristics include on one or more of:
      a quantity and types of joins in the second valid query,
      a quantity and types of functions in the second valid query,
      a quantity and types of conditions in the second valid query,
      a quantity and types of operations in the second valid query,
      a quantity and types of clauses in the second valid query,
      a quantity and the types of keywords in the second valid query,
      a quantity, nested level, and types of sub-queries in the second valid query,
      a quantity and types of columns used in the second valid query,
      querying a time series table, and
      inclusion of time predicates.

16. The method of claim 12, wherein:
   the second set of characteristics corresponding to the second valid query comprise query language plan characteristics; and
   applying the plurality of rules to the second set of characteristics corresponding to the second valid query comprises:
      determining the query language plan characteristics of the second valid query; and
      triggering an action limiting execution of the second valid query based on a first rule of the plurality of rules, the first rule including one or more of the query language plan characteristics, wherein the query language plan characteristics include one or more of:
         a number of rows in the first database,
         a number of rows accessed in the first database,
         a number of rows to be returned by the second valid query,
         an amount of data to be processed for the second valid query,
         the second valid query causing a full table scan,
         a query response time for execution of the second valid query,
         resource usage for execution of the second valid query, and
         a time for execution of the second valid query.

17. The method of claim 12 further comprising:
   determining a current state, a predicted future state, and a past state of the valid database; and
   triggering an action limiting execution of the second valid query based on a first rule of the plurality of rules, the first rule including one or more of the current state, the predicted future state, or the past state, wherein the current state, the predicted future state, and the past state include one or more of:
query characteristics,
query execution plan characteristics,
query characteristics of the first user, and
available computing resources.

18. The method of claim 12 further comprising:
receiving, from the first user via the computer-user interface, a third request to execute a third valid query on the first database, the third valid query comprising a third plurality of elements; and
applying the plurality of rules to a third set of characteristics corresponding to the third valid query to select a third subset of the plurality of actions for application to the third valid query, wherein:
the first set of characteristics is different than the third set of characteristics, and
the first subset of the plurality of actions is different than the third subset of the plurality of actions,
the third subset of the plurality of actions comprises a third action of the plurality of actions, and
the third action comprises executing the third valid query with a set of access control restrictions, wherein the set of restrictions comprises one or more of:
a time limit for execution of the third valid query,
a set of resources that may be accessed by the third valid query,
a number of rows that can be returned,
locking out the user, and
a number of queries that may be concurrently executed with the third valid query.

19. The method of claim 12, wherein:
the first valid query is directed to a first table of the first database; and
the second valid query is directed to the first table of the first database.

20. The method of claim 12, wherein limiting the second valid query comprises rejecting execution of the second valid query on the first database.

21. The method of claim 12, wherein limiting the second valid query comprises restricting the second valid query during execution of the second valid query on the first database.

22. The method of claim 12, wherein limiting the second valid query comprises restricting the second valid query after executing the second valid query on the first database.

23. A system comprising:
at least one device including a hardware processor, the system being configured to perform operations comprising:
receiving a plurality of rules to apply to queries for configuring a respective plurality of actions corresponding to the queries;
storing the plurality of rules to apply to the queries;
receiving, from a first user via a computer-user interface, a first request to execute a first valid query on a first database, the first valid query comprising a first plurality of elements;
applying the plurality of rules to a first set of characteristics corresponding to the first valid query to select a first subset of the plurality of actions for application to the first valid query, wherein:
the first subset of the plurality of actions comprises a first action, and
the first action comprises execution of the first valid query on the first database without limitations conditioning or restricting execution of the first valid query;
based on the first action, executing the first valid query
receiving, from the first user via the computer-user interface, a second request to execute a second valid query on the first database, the second valid query comprising a second plurality of elements;
selecting a second subset of the plurality of actions for application to the second valid query by applying the plurality of rules to a second set of characteristics corresponding to the second valid query, wherein:
the first set of characteristics is different than the second set of characteristics, and
the first subset of the plurality of actions is different than the second subset of the plurality of actions,
the second subset of the plurality of actions comprises a second action of the plurality of actions,
the second action comprises an operation controlling the second valid query on the first database to execute with a limitation, and
the limitation specifies a condition or a restriction on execution of the second valid query; and
based on the second action, executing the second valid query on the first database in accordance with the condition or the restriction specified by the limitation.

24. The system of claim 23, wherein:
receiving the first request to execute the first valid query comprises determining a first query is authorized based on one or more validation policies for a first user; and
receiving the second request to execute the second valid query comprises determining a second valid query is authorized based on the one or more validation policies for the first user.

25. The system of claim 23, wherein applying the plurality of rules to the first set of characteristics corresponding to the first valid query to select the first action of the plurality of actions comprises:
determining that the first valid query matches a stored criterion; and
selecting the first action responsive to the first action being mapped to the stored criterion.

26. The system of claim 23, wherein:
the second set of characteristics corresponding to the second valid query comprise query language characteristics; and
applying the plurality of rules to the second set of characteristics corresponding to the second valid query comprises:
determining the query language characteristics of the second valid query using a query language grammar, and
triggering an action limiting execution of the second valid query based on a first rule of the plurality of rules, the first rule including one or more of the query language characteristics,
wherein the query language characteristics include on one or more of:
a quantity and types of joins in the second valid query,
a quantity and types of functions in the second valid query,
a quantity and types of conditions in the second valid query,
a quantity and types of operations in the second valid query, a quantity and types of clauses in the second valid query, a quantity and the types of keywords in the second valid query, a quantity, nested level, and types of sub-queries in the second valid query, a quantity and types of columns used in the second valid query, querying a time series table, and inclusion of time predicates.

27. The system of claim 23, wherein:

the second set of characteristics corresponding to the second valid query comprise query language plan characteristics; and applying the plurality of rules to the second set of characteristics corresponding to the second valid query comprises:

determining the query language plan characteristics of the second valid query; and triggering an action limiting execution of the second valid query based on a first rule of the plurality of rules, the first rule including one or more of the query language plan characteristics, wherein the query language plan characteristics include one or more of:

a number of rows in the first database, a number of rows accessed in the first database, a number of rows to be returned by the second valid query, an amount of data to be processed for the second valid query, the second valid query causing a full table scan, a query response time for execution of the second valid query, resource usage for execution of the second valid query, and a time for execution of the second valid query.

28. The system of claim 23, wherein the operations further comprise: determining a current state, a predicted future state, and a past state of the valid database; and triggering an action limiting execution of the second valid query based on a first rule of the plurality of rules, the first rule including one or more of the current state, the predicted future state, or the past state, wherein the current state, the predicted future state, and the past state include one or more of:

query characteristics, query execution plan characteristics, query characteristics of the first user, and available computing resources.

29. The system of claim 23, wherein the operations further comprise:

receiving, from the first user via the computer-user interface, a third request to execute a third valid query on the first database, the third valid query comprising a third plurality of elements; and applying the plurality of rules to a third set of characteristics corresponding to the third valid query to select a third subset of the plurality of actions for application to the third valid query, wherein:

the first set of characteristics is different than the third set of characteristics, and the first subset of the plurality of actions is different than the third subset of the plurality of actions, the third subset of the plurality of actions comprises a third action of the plurality of actions, and the third action comprises executing the third valid query with a set of access control restrictions, wherein the set of restrictions comprises one or more of:

a time limit for execution of the third valid query, a set of resources that may be accessed by the third valid query, a number of rows that can be returned, locking out the user, and a number of queries that may be concurrently executed with the third valid query.

30. The system of claim 23, wherein:

the first valid query is directed to a first table of the first database; and the second valid query is directed to the first table of the first database.

* * * * *

UNITED STATES PATENT AND TRADEMARK OFFICE
CERTIFICATE OF CORRECTION

PATENT NO. : 12,164,520 B2  
APPLICATION NO. : 18/163107  
DATED : December 10, 2024  
INVENTOR(S) : Jayaraj et al.

Page 1 of 1

It is certified that error appears in the above-identified patent and that said Letters Patent is hereby corrected as shown below:

In the Specification

In Column 11, Line 38, delete "LEAVES.LEAVE ID," and insert -- LEAVES.LEAVE_ID, --, therefor.

In the Claims

In Column 17, Line 31, in Claim 12, delete "query" and insert -- query; --, therefor.

In Column 20, Line 5, in Claim 23, delete "query" and insert -- query; --, therefor.

Signed and Sealed this  
First Day of April, 2025

Coke Morgan Stewart  
*Acting Director of the United States Patent and Trademark Office*